March 1, 1949.

M. J. O. STRUTT ET AL
CIRCUIT ARRANGEMENT COMPRISING A PUSH-PULL
OSCILLATORY CIRCUIT FOR VERY SHORT WAVES
Filed Jan. 8, 1946

2,463,440

INVENTORS
MAXIMILIAAN JULIUS OTTO STRUTT
& JOHANNES MARINUS VAN HOFWEEGEN

BY

ATTORNEY.

Patented Mar. 1, 1949

2,463,440

UNITED STATES PATENT OFFICE 2,463,440

CIRCUIT ARRANGEMENT COMPRISING A PUSH-PULL OSCILLATORY CIRCUIT FOR VERY SHORT WAVES

Maximiliaan Julius Otto Strutt and Johannes Marinus van Hofweegen, Eindhoven, Netherlands, assignors, by mesne assignments, to Hartford National Bank and Trust Company, Hartford, Conn., as trustee Application January 8, 1946, Serial No. 639,852
In the Netherlands July 28, 1941

Section 1, Public Law 690, August 8, 1946
Patent expires July 28, 1961

5 Claims. (Cl. 178—44)

1

This invention relates to a circuit arrangement comprising a push-pull oscillatory circuit for very short waves which by means of two substantially parallel conductors is connected to a source of energy or a load.

Figure 1:
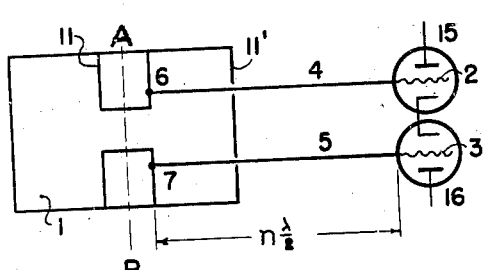

Such a circuit arrangement is shown in Fig. 1 of the accompanying drawing, in which an oscillatory circuit 1 is shown whose axis of symmetry is designated by A—B and which is constituted by two concentric conductors 11 and 11'. The control grids 2 and 3 of two push-pull connected amplifier valves 15 and 16 are connected to two points 6 and 7 of the circuit 1 by conductors 4 and 5. The electric length of the conductors 4 and 5 is generally equalized with an entire number of half-wave-lengths, as indicated in the figure. It is thus expected that the high frequency voltages set up at the control grids 2 and 3 of the amplifier valves will be substantially equal to the voltages occurring at the points 6 and 7. In practice, however, such is found not to be the case; measurements undertaken revealed that the voltage that occurs at the grids 2 and 3 in actual fact is only a fraction, for example from 1/20 to 1/50 of the voltage at the points 6 and 7.

According to the invention, this voltage drop is neutralized by the conductors through which the oscillatory circuit is connected to a source of energy or a load being crossed at such a point that the resulting mutual induction between each of the conductors and the oscillatory circuit is at least approximately zero. In the case of oscillatory circuits comprising an at least substantially closed system of parallel or concentric conductors, the crossing is preferably effected inside the oscillatory circuit.

The invention is based on recognition of the fact that the voltage drop in the conductors 4 and 5 is due to the occurrence of mutual induction between each of the said conductors and the oscillatory circuit due to which the conductors have set up in them an induction voltage which counteracts the voltage originally present.

Figure 2:
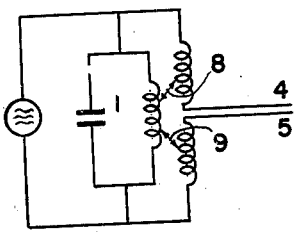

The substitution diagram of the circuit arrangement shown in Fig. 1 can therefore be shown as indicated in Fig. 2 in which the mutual induction between the conductor 4 and the conductor 5 and the circuit 1 is designated by 8 and 9 respectively. It is obvious that by rea-

2 son of this mutual induction the voltage supplied to the load may fall considerably.

Figure 3:
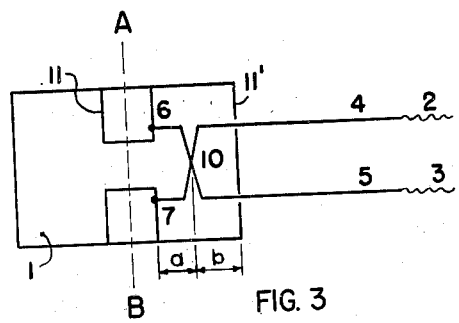
Figure 4:
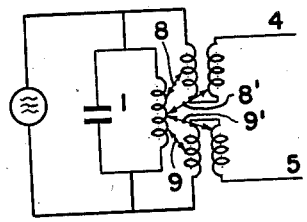

One embodiment of the invention is shown in Fig. 3. The two Lecher system wires 4 and 5 which connect the load 2, 3 to the points 6 and 7 of the circuit 1 are crossed at the point 10. The substitution diagram of this circuit arrangement is shown in Fig. 4. If the crossing is arranged at the correct point, the mutual inductions 8, 8' and 9, 9' respectively will just neutralize one another. For this purpose, in the embodiment shown in Fig. 3, the distance $a$ between the crossing and the inner conductor of the circuit will have to be less than the distance $b$ between the crossing and the outer conductor because the electro-magnetic field will be most powerful adjacent the inner conductor 11.

Figure 5:
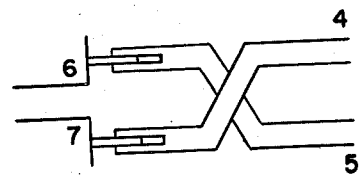

In order to enable adjustment of the compensation in view, the circuit arrangement according to the invention is preferably so arranged that the ratio of the mutual inductions between the oscillatory circuit and the parts of the conductors 4 and 5 situated respectively in front of and behind the crossing can be varied. This may be ensured for example by rendering $a$ and thus the point of the crossing, adjustable. Fig. 5 shows an embodiment thereof. The points of contact 6 and 7 are provided with studs and the crossed conductors 4 and 5 are constructed as tubes that can be shifted on the said studs.

Figure 6:
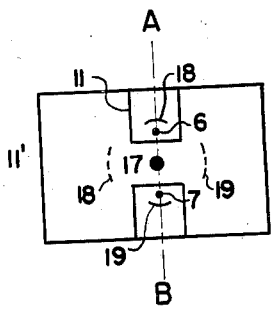
Figure 7:
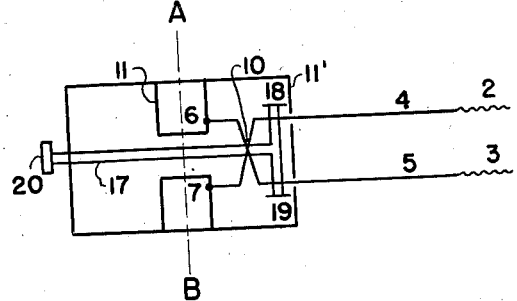

A further embodiment of the circuit arrangement according to the invention, in which the compensation is adjustable, is shown in Figs. 6 and 7. Fig. 6 is a sectional view of the oscillatory circuit 1 which is rotated through 90° with respect to those shown in Figs. 1, 3 and 4 so that the conductors 6 and 7 are visible in Fig. 6 in section. According to the invention, two small screening plates 18 and 19 are arranged behind the crossing 10 and are located between the oscillatory circuit and the conductors 6 and 7 respectively, whilst being at the same time jointly rotatable about a spindle 17. They may therefore also occupy the position 18'—19'. It is obvious that in the latter position the screening effect of the small plates is less than in position 18—19. Turning a knob 20 permits of adjusting the position of the screening plates and thus the mutual induction between the parts of the conductors 4 and 5 located in front of and behind the crossing and the circuit 1.

The invention may be used even when the conductors between the tuning circuit and the load (or the source of energy respectively) have any desired length.

What we claim is:

1. In combination, a resonant circuit for sustaining high frequency oscillations and a transmission line formed by two parallel wires for coupling said circuit to a load, one end of each wire being connected to said circuit, said wires being crossed at a point relative to said circuit at which the resulting mutual induction between each of the wires and the circuit is substantially zero.

2. In combination, an enclosed concentric resonator for sustaining high frequency oscillations in a push-pull manner, said resonator including an outer conductor surrounding a pair of colinear inner conductors, and a transmission line formed by a pair of parallel wires for coupling said resonator to a load, one end of each wire being extended through said outer conductor and connected to a respective inner conductor, said wires being crossed within said resonator at a point at which the resulting mutual induction between each wire and the resonator is substantially zero.

3. In combination, an enclosed concentric resonator for sustaining high frequency oscillations in a push-pull manner, said resonator including an outer conductor surrounding a pair of colinear inner conductors, a transmission line formed by a pair of parallel wires for coupling said resonator to a load, one end of each wire being extended through said outer conductor and connected to a respective inner conductor, said wires being crossed within said resonator, and means to adjust the position of the point at which said wires are crossed.

4. In combination, an enclosed concentric resonator for sustaining high frequency oscillations in a push-pull manner, said resonator including an outer conductor surrounding a pair of colinear inner conductors each having a connecting member projecting laterally therefrom, and a transmission line formed by a pair of parallel wires for coupling said resonator to a load, one end portion of each wire being of hollow construction and extended through said outer conductor to slidably engage the connecting member of a respective inner conductor, said wires being crossed within said resonator.

5. In combination, an enclosed concentric resonator for sustaining high frequency oscillations in a push-pull manner, said resonator including an outer conductor surrounding a pair of colinear inner conductors, a transmission line formed by a pair of parallel wires for coupling said resonator to a load, one end of each wire being extended through said outer conductor and connected to a respective inner conductor, said wires being crossed within said resonator at a predetermined point, a pair of screening plates arranged within said resonator, each plate being interposed between an end of said resonator and that portion of each wire extending from said inner conductor to said predetermined point, and means for simultaneously adjusting the positions of said plates about an axis intermediate said wires.

MAXIMILIAAN JULIUS OTTO STRUTT.
JOHANNES MARINUS van HOFWEEGEN.

REFERENCES CITED

The following references are of record in the file of this patent:

UNITED STATES PATENTS

| Number | Name | Date |
|---|---|---|
| 2,021,734 | Macalpine | Nov. 19, 1935 |
| 2,093,750 | G. DeVries | Sept. 21, 1937 |
| 2,238,262 | Happe Jr. et al. | Apr. 15, 1941 |

FOREIGN PATENTS

| Number | Country | Date |
|---|---|---|
| 272,407 | Great Britain | June 16, 1927 |